Sept. 29, 1959     A. L. FREEDLANDER     2,906,312
WHEEL COVER FOR VEHICLES
Filed Jan. 13, 1958
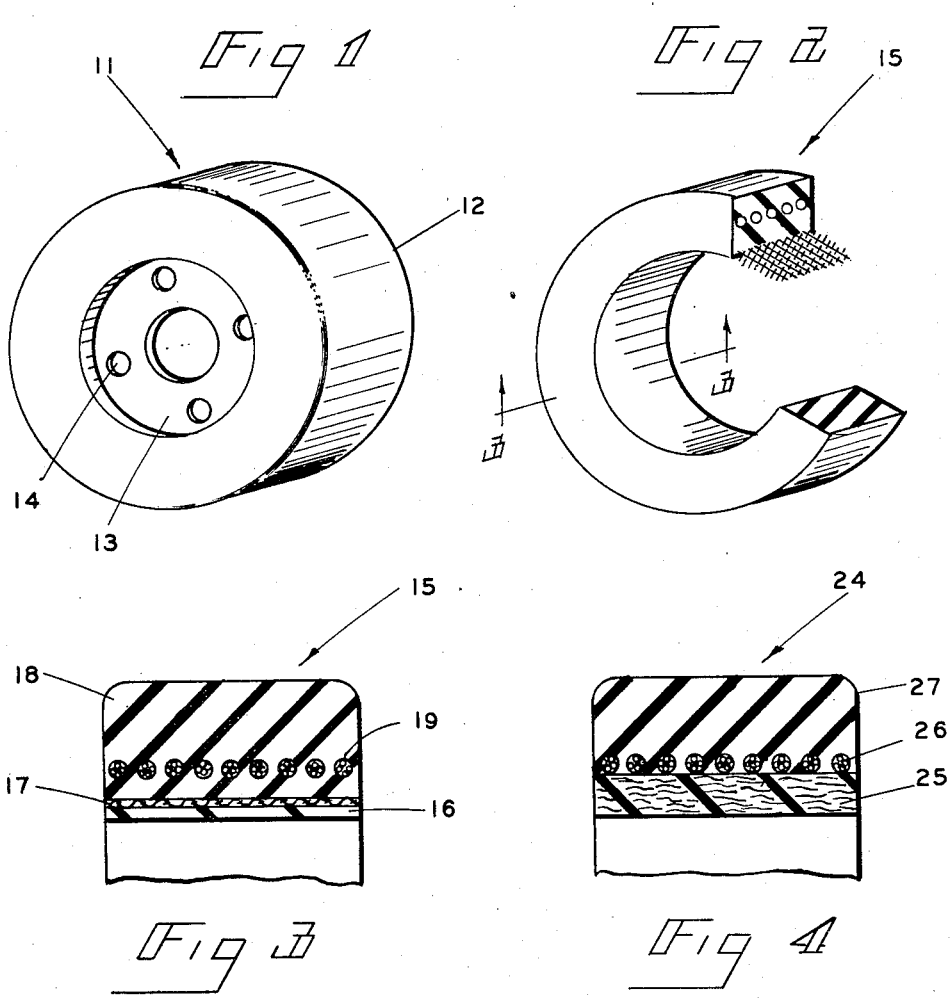
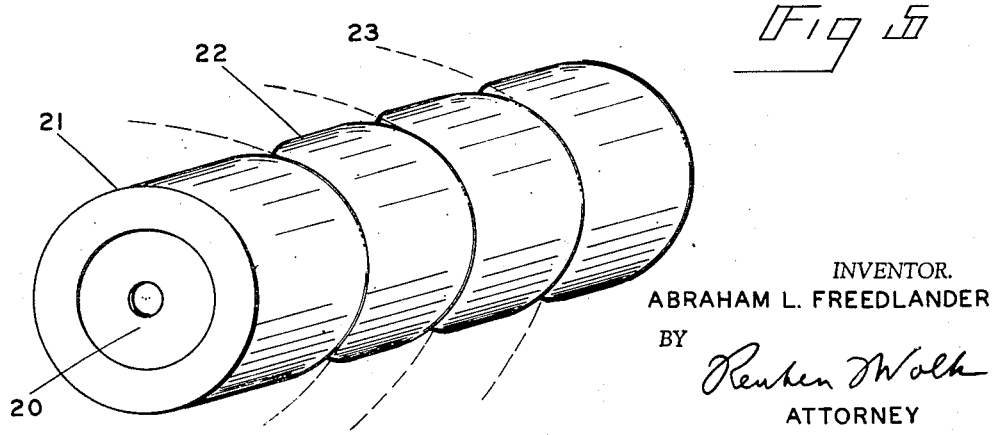
INVENTOR.
ABRAHAM L. FREEDLANDER
BY
ATTORNEY

United States Patent Office 2,906,312
Patented Sept. 29, 1959

2,906,312

WHEEL COVER FOR VEHICLES

Abraham L. Freedlander, Dayton, Ohio, assignor to The Dayton Rubber Company, Dayton, Ohio, a corporation of Ohio Application January 13, 1958, Serial No. 708,535

8 Claims. (Cl. 152—323)

This invention relates to wheel covers, and particularly to wheel covers or tires for industrial lift trucks, trailers, delivery carts, etc., which are applied to metal wheels on such vehicles. It is conventional to use these conveyances in factories where materials must be transported from place to place. These conveyances must be fitted with a cushioned wheel that eliminates a severe load on the factory floor, as well as providing a certain amount of resilience to the load being transported and a high abrasion resistance. It is desirable in many such instances to use a solid resilient tire or wheel cover because such tires are inexpensive, easy to build, and simple to replace. Further, such tires are resistant to the high loads which occur in the wheels, having a strong tendency to strip the covers from the wheels.

In the prior art there have been many instances of the use of such solid wheel covers. These covers are frequently expensive or difficult to manufacture and apply because they are conventionally bonded directly to the wheel by the manufacturer. When the resilient cover wears out, therefore, the entire wheel must be removed and re-covered in the manufacturer's plant. It is desirable to utilize instead a wheel cover which can be mounted and removed in similar fashion to pneumatic tires used on passenger vehicles, and it is further desirable to be able to stock these covers in a minimum number of sizes so that they may be installed on the job. In order to do this, therefore, these covers must have an internal structure which is sufficiently resilient to be placed on the wheel with ease while at the same time retaining the other desirable properties. Further, the covers must be sufficiently strong to resist the phenomenon known as the "traction wave," which is an external bulge on the periphery of the wheel cover just ahead of the point where the wheel cover meets its contacting surface. This is caused in many conventional wheel covers by insufficient strength in the cover permitting the material to be bunched during rotation of the wheel.

The above problems are overcome in the present invention by fabricating a cover having a spun cord within the matrix, thus taking advantage of the uniform tension and strength imparted by the helical positioning of such a cord. At the the same time the spun cord maintains the cover tightly on the wheel while resisting the traction wave and keeping the torque concentration in the wheel cover to a minimum. The reinforcing cord material to be used, however, must couple this strength with a certain amount of controlled stretch in order to permit the cover to be stretched over the wheel. Such a material will be described later. In order to prevent the cords from directly contacting the surface of the wheel, it is desired to place a layer of bias fabric between the cord and the wheel. This direct contact may be caused by the tendency of certain types of cords to contract when spun in helical fashion, similar to the action of a torsion spring. It is desirable to prevent contacting the wheel because the change in diameter of the cords should be kept to a minimum for maximum strength. Further, contact of the cord causes a scuffing effect on the wheel. The fabric plays a further part in that it adds strength to the structure.

It is a primary object of this invention, therefore, to provide a wheel cover which may be readily mounted and dismounted.

It is a further object to provide a cover having extremely long life and a high degree of resilience.

It is a further object to provide a cover which closely envelops the wheel upon which it is mounted.

It is an additional object to provide a wheel cover of sufficient stretch to accommodate several sizes of wheels.

It is still another object of this invention to provide a wheel cover which is highly resistant to abrasion and oil.

It is still another object of this invention to provide a wheel cover which may be permanently attached to the wheel without vulcanization.

A further object of this invention is to provide a wheel cover having various degrees of hardness.

These and other objects will be more readily apparent upon referring to the accompanying specification and drawings, in which:

Figure 1 is a perspective view of a typical wheel upon which my novel cover is to be mounted.

Figure 2 is a perspective view partially in section of a typical cover ready for mounting on the wheel of Figure 1.

Figure 3 is a fragmentary sectional view of one form of the invention taken along lines 3—3 of Figure 2.

Figure 4 is a fragmentary sectional view similar to Figure 3 illustrating a modification of the invention.

Figure 5 is a perspective view of a vulcanized sleeve upon a drum prior to cutting into separate wheel covers.

Referring now to Figure 1 of the drawings, reference numeral 11 illustrates a typical wheel such as used for industrial vehicles. This wheel 11 simply consists of a peripheral metal band 12 and a center flange 13 as an integral part of this band. The flange has a plurality of mounting holes 14 by which the wheel is mounted on the vehicle.

Figures 2 and 3 illustrate the principal embodiment of the invention in which the wheel cover 15 consists of an inner section 16, a layer of bias fabric 17, and an outer section 18 in which is embedded a layer of helically spun cords 19. The fabric 17 is woven by conventional means and consists of a high strength material such as nylon, polyester fibers (such as those having the trade designation "Dacron"), rayon, other synthetic fibers, cotton, ramie, other natural fibers, glass, wire, or other materials possessing this desirable property; while at the same time permitting a certain amount of stretch. The cords 19 may be made of any of these materials. Both the inner section 16 and the outer section 18 are preferably compounds of a natural or synthetic rubber or any desirable combination thereof. The synthetic rubber may be one of the type commonly used in passenger tires such as butadiene-acrylic nitrile copolymers, butadiene-styrene copolymers, or polychloroprenes. If desired, the compound may be light in color in the outer section. This results in a non-marking cover in factories where it is important to avoid marking. The wheel cover is preferably made by conventional methods such as known in the belt-making art by building a sleeve in layers on a drum. The sleeve is formed by successively wrapping the inner section, the fabric, part of the outer section, spinning the cords, and wrapping the remainder of the outer section around the drum. The sleeve is then vulcanized or cured in order to bond all of the materials together, after which it is cut into the desired widths and removed from the drum. The exact shape of the cover may be varied from that shown; for example, instead of sharp edge surfaces a slight bevel or rounded effect may be created by buffing, skiving by special cutters, or by the molding process itself. One example of a sleeve build-up is shown in Figure 5 in which a drum 20 is illustrated upon which has been molded a sleeve 21 having a series of crowns or concave caps 22. The sleeve is removed from the drum and cut into individual covers by cutting along dotted lines 23 in order to provide the final product. Each cover will therefore have the desired crowned shape as a result of the molding process and the cutting operation.

The individual covers are mounted upon the wheels by a method well known in the art which merely involves sliding the cover over a conical drum which is small enough at one end to fit within the wheel and large enough at the other end to exceed the outer diameter of the wheel. The cover is made with a slightly smaller inner diameter than the outer diameter of the wheel in order that it may be slightly stretched during mounting but compresses for a tight fit around the circumference of the wheel. The resulting product is one that has an extremely high strength and resistance to the torque loads which are applied. It should be noted that the ability of the cover to grip the wheel may be largely due to the pre-stretched cord 19 if this cord is nylon, polyester or other synthetic fibers; or may be largely due to the resilience of the inner layer 16 where the cord has a limited amount of pre-stretch as in the case of wire, glass, or natural fibers. The exact combination of cord materials and inner layer materials depends on the type of product desired as well as other factors. If desired, prior to placing the cover on the wheel a layer of adhesive may be placed upon the wheel to act as a lubricant during the process and then hardened to hold the wheel on the rim. This adhesive may be any conventional material which has particularly good properties when bonding rubber to metal.

Figure 4 illustrates a modified form of the above cover, designated by reference numeral 24. In contrast to the previous form of the invention, the innermost member 25 is composed of a compound of synthetic and natural rubber materials in which are embedded comminuted textile fibers. Such a compound is commonly known as "Stiflex," such as referred to in U.S. Patent No. 2,281,148. The compound is preferably one of great hardness in order to hold the cords. The layer of helical cords 26 is spun upon the member 25, and similar to the layer of cords 19 of the principal modification. The comminuted fibers in the member 25 are generally transverse of the wheel cover, and serve a similar purpose to the fabric layer 17; namely, to prevent the cords from cutting through the section 25 because of the inherent radially inward component of force exerted by the cords. In addition, member 25 provides a cushioning effect. An outer layer or section 27 surrounds the layer of cords and is composed of a compound similar to the section 18 of the principal form of the invention.

The invention should not be construed as limited to the specific details shown, but may be modified in accordance with the spirit of the invention.

I claim:

1. A wheel cover comprising inner and outer sections of resilient elastomeric material bonded together to form an integral annular member, said inner section including comminuted textile fibers extending in a direction primarily transverse of said cover, said outer section including a layer of helically spun cords generally circumferential of said cover.

2. The cover of claim 1 in which said cords are nylon.

3. The cover of claim 1 in which said cords are polyester fibers.

4. A wheel cover adapted for mounting on a wheel comprising an outer resilient working section having helically spun cords embedded therein, an inner section adjacent said wheel, and textile fibers located between said cords and said wheel, said outer and inner sections and said fibers bonded together to form a unitary member.

5. The cover of claim 4 in which said cords are nylon.

6. The cover of claim 4 in which said cords are polyester fibers.

7. The cover of claim 4 in which said cords are glass.

8. The cover of claim 4 in which said cords are wire.

References Cited in the file of this patent

UNITED STATES PATENTS

| | | |
|---|---|---|
| 2,388,319 | Fuller | Nov. 6, 1945 |
| 2,525,196 | Bacon | Oct. 10, 1950 |
| 2,526,324 | Bloomfield | Oct. 17, 1950 |
| 2,737,468 | Waugh | Mar. 6, 1956 |